United States Patent
Nokaido et al.

(10) Patent No.: US 12,515,684 B2
(45) Date of Patent: Jan. 6, 2026

(54) ELECTRONIC CONTROL UNIT AND ELECTRONIC CONTROL SYSTEM

(71) Applicant: HITACHI ASTEMO, LTD., Hitachinaka (JP)

(72) Inventors: Takaaki Nokaido, Ibaraki (JP); Yusuke Kogure, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 286 days.

(21) Appl. No.: 17/790,854

(22) PCT Filed: Dec. 8, 2020

(86) PCT No.: PCT/JP2020/045572
§ 371 (c)(1),
(2) Date: Jul. 5, 2022

(87) PCT Pub. No.: WO2021/140810
PCT Pub. Date: Jul. 15, 2021

(65) Prior Publication Data
US 2023/0027587 A1 Jan. 26, 2023

(30) Foreign Application Priority Data
Jan. 10, 2020 (JP) ................................ 2020-003143

(51) Int. Cl.
*B60W 50/06* (2006.01)
*G06F 8/65* (2018.01)

(52) U.S. Cl.
CPC ............... *B60W 50/06* (2013.01); *G06F 8/65* (2013.01)

(58) Field of Classification Search
CPC ................................. B60W 50/06; G06F 8/65
See application file for complete search history.

(56) References Cited

U.S. PATENT DOCUMENTS

| | | | |
|---|---|---|---|
| 7,054,790 B1* | 5/2006 | Rich | ............... G06F 11/3419 710/60 |
| 2009/0037046 A1* | 2/2009 | Teramura | ............... F02D 41/22 701/33.4 |

(Continued)

FOREIGN PATENT DOCUMENTS

| JP | 2005-132131 A | 5/2005 |
|---|---|---|
| JP | 2015-037938 A | 2/2015 |

(Continued)

OTHER PUBLICATIONS

International Search Report translated into English, and Written Opinion (Japanese), for PCT/JP2020/045572 dated Apr. 13, 2021 (8 pages).

*Primary Examiner* — Anne Marie Antonucci
*Assistant Examiner* — Luis G Del Valle
(74) *Attorney, Agent, or Firm* — Foley & Lardner LLP

(57) ABSTRACT

Provided is a program updating process according to which even when power supply to an electronic control unit stops during program updating, invalid data's remaining in a storage area at completion of program updating is prevented without acquiring a power supply status of a vehicle. An electronic control unit includes a communication interface, a nonvolatile memory, and an arithmetic processing unit that executes a program. The nonvolatile memory includes a program storage area and a data storage area. The program storage area has a program updating process unit that carries out an updating process, and a program updating target unit that stores an updating program. The arithmetic processing unit reads the program updating process unit as the program and executes the program, divides an updating program received by the communication interface into divided updating programs each having a given size, and writes each of the divided updating programs to the program updating target unit. The arithmetic processing unit stores updating (Continued)

progress data in the data storage area, the updating progress data indicating a position of the divided updating program having been written to the program updating target unit.

11 Claims, 13 Drawing Sheets

(56) References Cited

U.S. PATENT DOCUMENTS

| | | | | |
|---|---|---|---|---|
| 2010/0165848 A1* | 7/2010 | Iwazaki | ............. | H04L 61/5007 |
| | | | | 370/328 |
| 2013/0104121 A1* | 4/2013 | Iwaya | ................... | H04L 65/60 |
| | | | | 709/219 |
| 2021/0117177 A1* | 4/2021 | Noda | ................. | B60R 16/0231 |
| 2021/0157574 A1* | 5/2021 | Harata | .................... | G06F 8/658 |
| 2021/0344413 A1* | 11/2021 | Gao | ..................... | H04W 24/02 |

FOREIGN PATENT DOCUMENTS

| | | | | | |
|---|---|---|---|---|---|
| JP | 2015-098311 A | | 5/2015 | | |
| JP | 2019-016086 A | | 1/2019 | | |
| JP | 2019020837 A | * | 2/2019 | ............. | G06F 8/654 |

\* cited by examiner

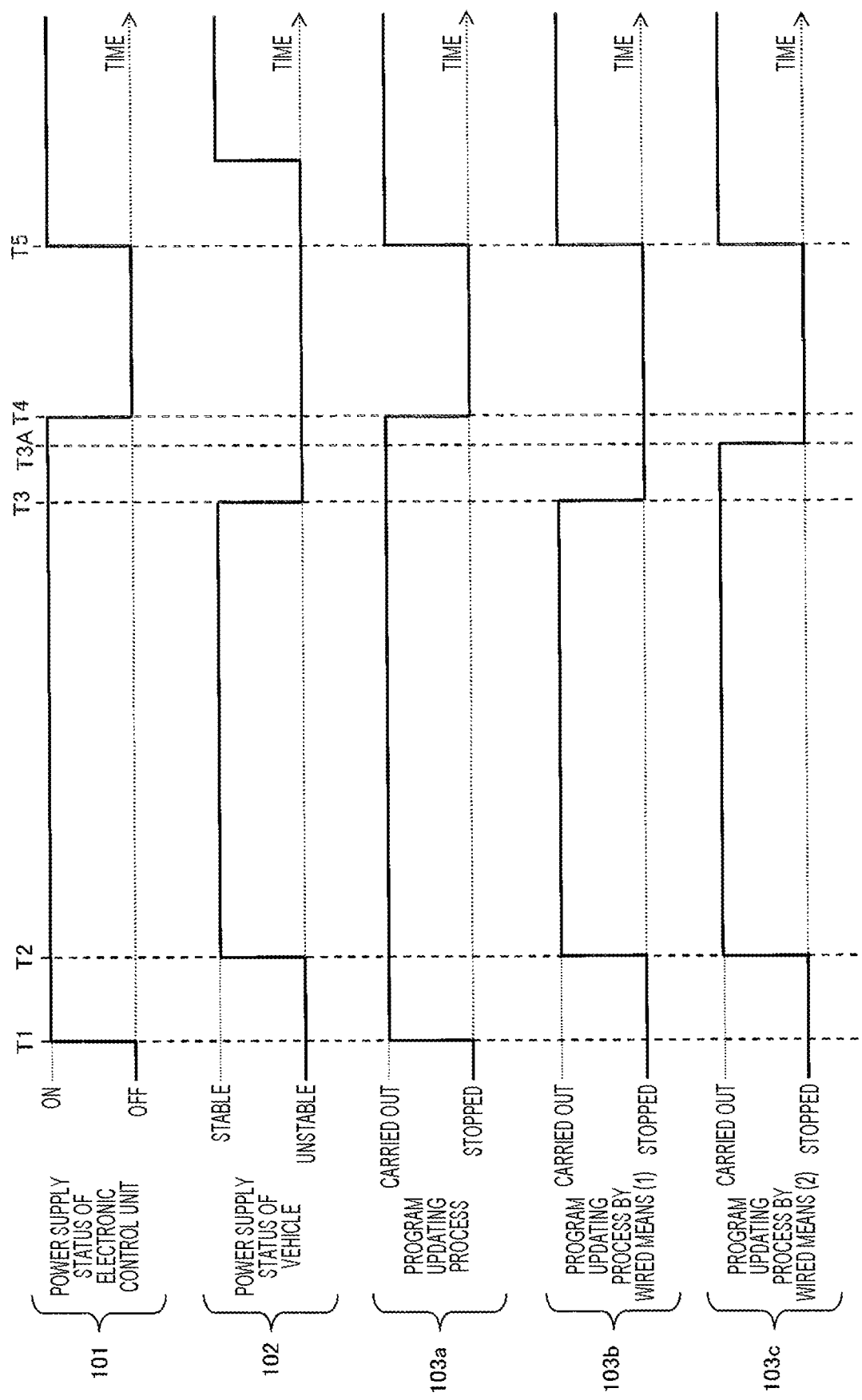

ELECTRONIC CONTROL UNIT AND ELECTRONIC CONTROL SYSTEM

TECHNICAL FIELD

The present invention relates to updating of a program of an electronic control unit of a vehicle.

BACKGROUND ART

As one of methods of updating a program of an electronic control unit (ECU) of a vehicle, an online updating function is known, by which a program wirelessly distributed from a program distribution center is downloaded via a network to update the program of the ECU.

Conventionally, when a user wants to update a program, the user himself or herself usually brings a vehicle to a dealer shop or the like, where a maintenance man connects a dedicated device to the vehicle and operates the dedicated device to update the program. Using the online updating function, however, allows the user to update the program without visiting the dealer shop. This makes it easy for the user to add a new function or improve an existing function and apply a new program from which any problem has been eliminated, thus offering effects of convenience improvement and time saving.

However, it is not always the case that power supply to the ECU in the vehicle is constantly stable, and a case where power supply to the ECU is stopped during program updating may possibly arise. For example, a battery power supply may stop supplying power to the ECU because of degradation or discharge, and an accessory (ACC) power supply may stop supplying power to the ECU after an elapse of a certain time when an ignition (IGN) power supply is in off-state.

When power supply to the ECU is stopped during program updating, invalid data remains in a program storage area. The user, therefore, cannot use a new program until the invalid data is detected and program updating is done again.

PTL 1 is known as a technique for solving the above problem. PTL 1 describes an apparatus that selects a period during which a supply voltage is stable to update a program in the selected period, thereby updating the program without leaving invalid data in a storage area.

CITATION LIST

Patent Literature

PTL 1: JP 2015-37938 A

SUMMARY OF INVENTION

Technical Problem

The above apparatus described in PTL 1 makes a determination on suspension and resumption of program updating, by acquiring a power supply status of the vehicle. Without having a reliable means for acquiring the power supply status, however, the ECU is unable to correctly carry out processes of suspending and resuming program updating. For example, the ECU, which cannot acquire the power supply status unless it is sent from an external device through a communication path, fails to acquire the power supply status in some cases because of a failure of the communication path or the external device.

An object of the present invention is to achieve a program updating process according to which, even when supply of power to an ECU stops during program updating by an online updating function of the ECU, invalid data's remaining in a storage area at completion of program updating is prevented without acquiring a power supply status of a vehicle.

Solution to Problem

The present invention provides an electronic control unit of a vehicle, the electronic control unit including: a power supply to which supply of power from outside is switched on or off; a communication interface that communicates with an external device; a nonvolatile memory that holds a program and data; and an arithmetic processing unit that executes the program. The nonvolatile memory includes a program storage area that stores the program, and a data storage area that stores data. The program storage area has a program updating process unit that carries out an updating process, and a program updating target unit that stores an updating program. The arithmetic processing unit reads the program updating process unit as the program and executes the program, divides an updating program received by the communication interface into divided updating programs each having a given size, and writes each of the divided updating programs to the program updating target unit. The arithmetic processing unit stores updating progress data in the data storage area, the updating progress data indicating a position of the divided updating program having been written to the program updating target unit.

Advantageous Effects of Invention

According to the present invention, writing-in of an updating program is continued until supply of power is stopped as a power supply status of the vehicle is not acquired. Even in a configuration in which the power supply status cannot be acquired in a reliable manner, therefore, a program updating process can be carried out. When supply of power is stopped during program updating, invalid data remains in an area where data writing has been in progress. However, at the next startup, an area where data writing is normally completed can be determined, based on updating progress data. By overwriting the invalid data remaining in the area with normal data, therefore, program updating can be completed without leaving the invalid data in the area.

Details of at least one embodiment of the subject matter disclosed herein will be set forth in the accompanying drawings and the following description. Other features, aspects, and effects of the disclosed subject matter will be made clear through the following descriptions, drawings, and claims.

BRIEF DESCRIPTION OF DRAWINGS

FIG. 10 depicts the fifth embodiment of the present invention, showing a time chart of an example of a program updating process.

DESCRIPTION OF EMBODIMENTS

Embodiments of the present invention will hereinafter be described with reference to the drawings.

First Embodiment

A first embodiment according to the present invention will be described with reference to FIGS. 1 to 4C.

Figure 1:
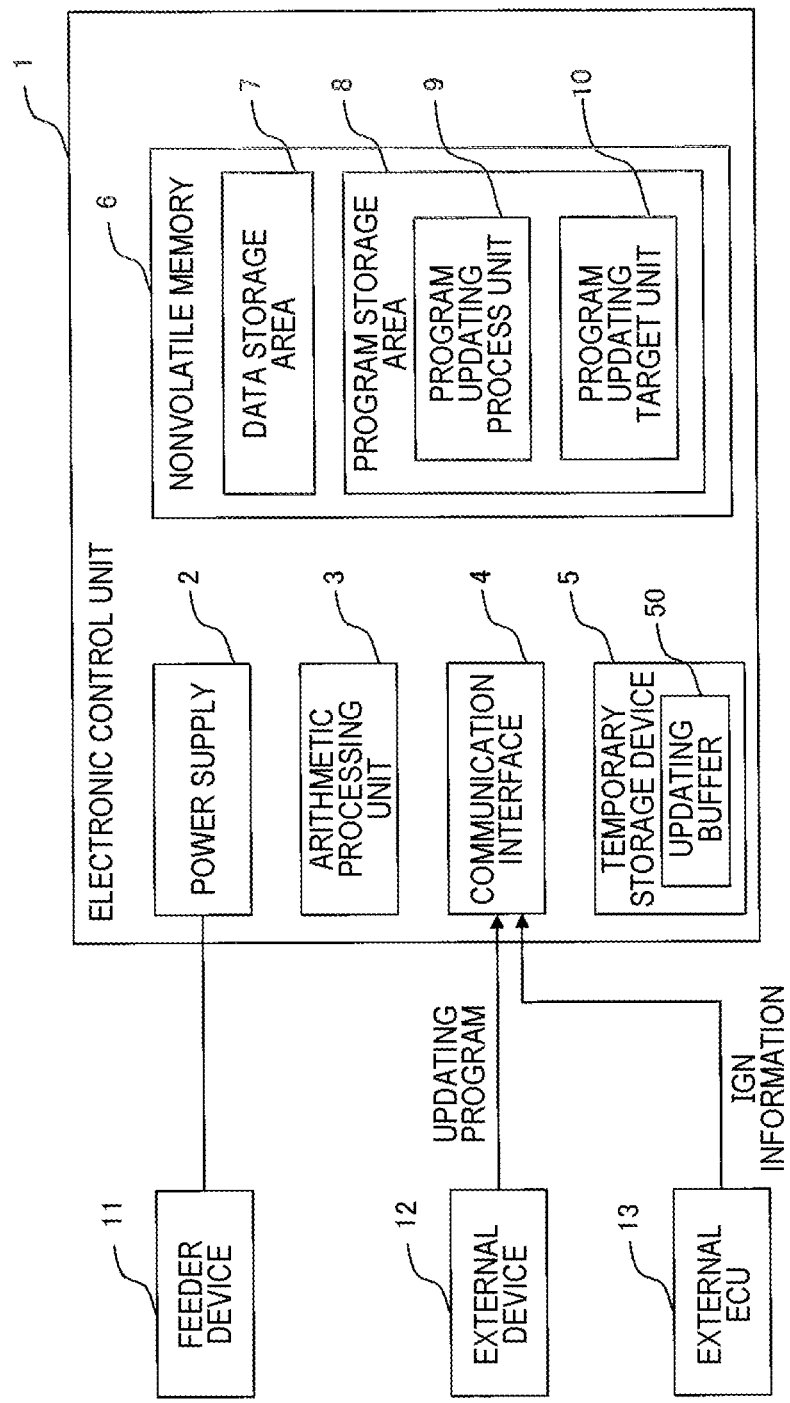
FIG. 1 depicts a first embodiment of the present invention, showing a block diagram of an example of an electronic control system incorporated in a vehicle.

FIG. 1 is a block diagram showing an example of a configuration of an electronic control system including an electronic control unit according to the present invention. An electronic control unit 1 includes a power supply 2, an arithmetic processing unit 3, a communication interface 4, a temporary storage device 5, and a nonvolatile memory 6.

The nonvolatile memory 6 includes a data storage area 7 and a program storage area 8, and the program storage area 8 has a program updating process unit 9 and a program updating target unit 10.

The program updating target unit 10 includes a standby area (not illustrated) to which an updating program is written, and an active area (not illustrated) in which a program (control program) for controlling the vehicle is stored. After writing of the updating program is completed, the standby area is switched with the active area at a given point of time (e.g., at the next startup), and the vehicle is controlled by the updating program.

In the electronic control unit 1 incorporated in the vehicle, the power supply 2 is supplied with power from a feeder device 11, such as a battery power supply and an ACC (ACCESARY) power supply. The electronic control unit 1 receives an updating program from an external device 12, via the communication interface 4. Control signals necessary for an updating process are exchanged between the external device 12 and the electronic control unit 1 through the communication interface 4.

The communication interface 4 is connected to an external ECU 13 that outputs ignition information, and acquires the ignition information (ON or OFF). The communication interface 4 may be connected to the external device 12 and external ECU 13 via a local area network (LAN), a controller area network (CAN), Flexray, or the like.

The external device 12 has a wireless communication unit (not illustrated), receiving an updating program from a distribution device via a wireless network and transmitting the updating program to the electronic control unit 1.

The arithmetic processing unit 3 is composed of an arithmetic unit including a processor. By executing the program updating process unit 9, the arithmetic processing unit 3 writes a received updating program to the program updating target unit 10 and writes data involved in an updating processing to the temporary storage device 5 and to the data storage area 7.

The program updating process unit 9 is read as a program, being loaded from the nonvolatile memory 6 onto the arithmetic processing unit 3, which executes the program updating process unit 9. The program updating process unit 9 writes an updating program to the standby area of the program updating target unit 10 of the nonvolatile memory 6, thus controlling a program updating process.

After supply of power to the power supply 2 is stopped or resumed during program updating, the electronic control unit 1 receives an updating restart request from the external device 12. In response to the updating restart request, the electronic control unit 1 returns an updating restart position. As a result, the external device 12 delivers an updating program that starts from the restart position.

The temporary storage device 5 can be configured as a volatile storage medium. For example, a DRAM or an SRAM can be adopted as the temporary storage device 5. An updating buffer 50 is set in the temporary storage device 5.

The arithmetic processing unit 3 executes a process according to a program of each functional unit, thereby working as a functional unit that provides a given function. For example, the arithmetic processing unit 3 executes a process according to an updating process program, thereby functioning as the program updating process unit 9. This applies also to other programs. Further, the arithmetic processing unit 3 works also as a functional unit that provides respective functions of a plurality of processes executed by each program. A computer and a computer system are a device and a system that include these functional units.

Figure 2:
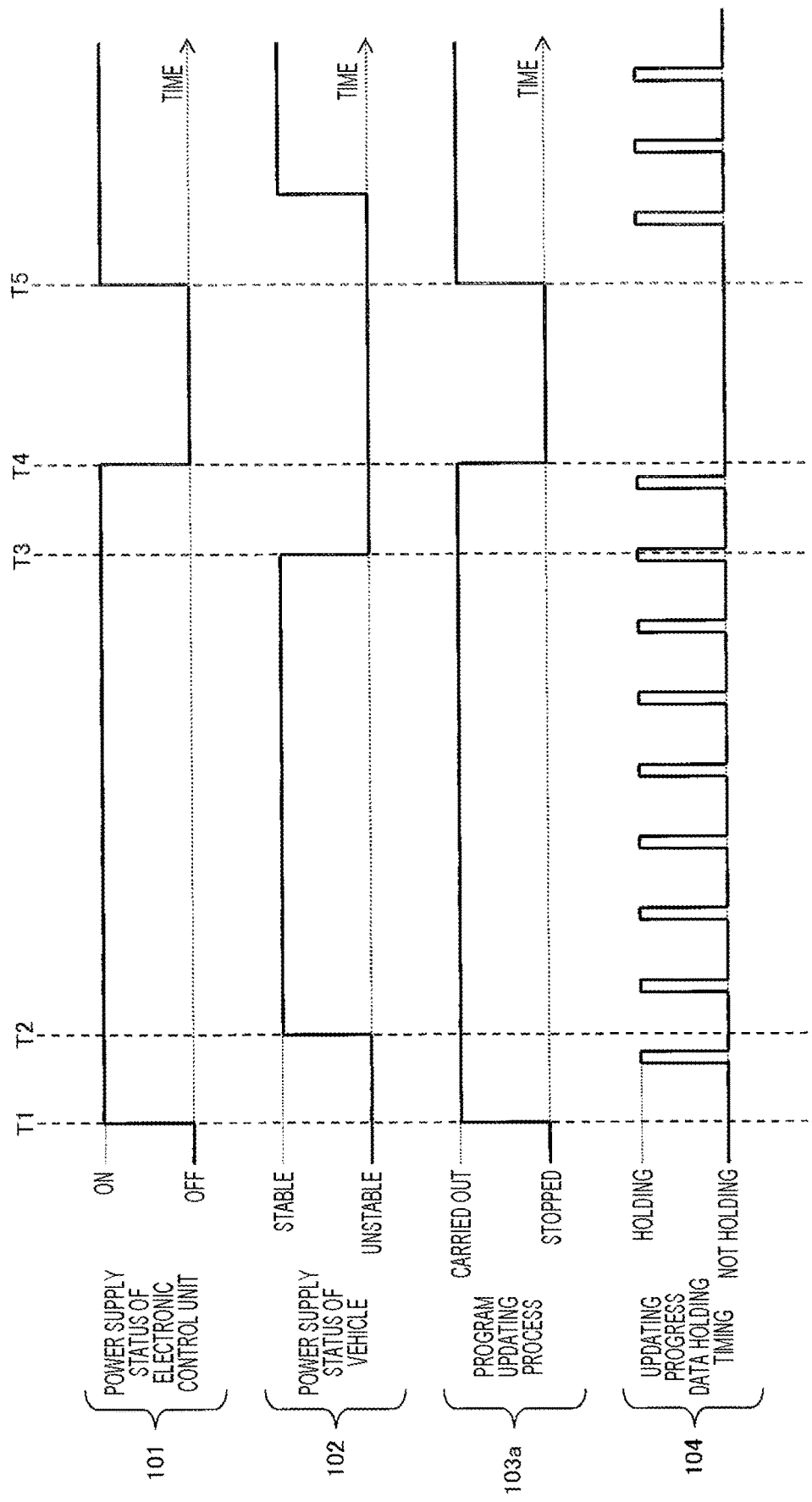
FIG. 2 depicts the first embodiment of the present invention, showing a time chart of an example of a program updating process.

A program updating process will be described with reference to a time chart of FIG. 2. FIG. 2 depicts a relationship between time transition and a power supply status 101 of the electronic control unit 1, a power supply status 102 of the vehicle, a program updating process 103a, and an updating progress data holding timing 104.

The power supply status 101 of the electronic control unit 1 indicates the presence or absence of power supply to the power supply 2. For example, in the case of a battery power supply, its supply of power to the power supply 2 is controlled through receiving of an information command on switching on or off the battery power supply, the information command being sent from the external device 12 (or the external ECU 13) via the communication interface 4. In the case of an ACC power supply, supply of power to the power supply 2 is controlled in connection with switching on or off of the ACC power supply.

The power supply status 102 of the vehicle indicates whether supply of power to the power supply 2 is stable. For example, when information of IGN (ignition) acquired from the external ECU 13 indicates on-state, charging of the battery is started to keep the ACC power supply on. It is therefore determined that supply of power to the power supply 2 is stable. In the case of an EV (electric vehicle), it can be said that supply of power to the power supply 2 is stable when the battery of the vehicle has been charged at a charging stand. It should be noted that the electronic control unit 1 may not acquire the power supply status of the vehicle.

The program updating process 103*a* indicates whether program updating is carried out when an updating program is transferred from the external device 12. The updating progress data holding timing 104 indicates timing of holding information indicating an area (or part) where writing of an updating program has been normally completed. As it will be described later, updating progress data is information that specifies a position (or part) of an updating program that has already been written to the program updating target unit 10.

The program updating process unit 9 monitors updating progress data indicating an area (or a part) where writing of an updating program has been normally completed, thereby controlling a state of progress of an updating process.

At time T1 in FIG. 2, it is indicated that supply of power from the feeder device 11 to the power supply 2 is started. At time T1, the power supply status 102 of the vehicle is unstable but the electronic control unit 1 is in a state of being supplied with power. The program updating process 103*a* is therefore carried out.

The program updating process 103*a* carries out writing of an updating program in units of a given size, and stores updating progress data in the data storage area 7 in units of completion of data writing to the program updating target unit 10 of the nonvolatile memory 6.

At time T2 in FIG. 2, it is indicated that the power supply status 102 of the vehicle is stable. The electronic control unit 1 carries out the program updating process and holding of the updating progress data in the same manner as does at time T1, regardless of the power supply status of the vehicle.

At time T3 in FIG. 2, it is indicated that the power supply status 102 of the vehicle has shifted from stable to unstable. At this time, the program updating process and holding of the updating progress data are carried out in the same manner as carried out at time T1.

At time T4 in FIG. 2, it is indicated that supply of power to the power supply 2 is stopped. When program updating is in progress at time T4, invalid data remains in the program updating target unit 10. Meanwhile, however, the updating progress data is stored in the data storage area 7 of the nonvolatile memory 6. At time T4, the updating progress data stored in the data storage area 7 of the nonvolatile memory 6 holds the address (or size or identifier) of an area (or part) where the updating process has been normally completed in the previous program updating.

At time T5 in FIG. 2, it is indicated that supply of power to the power supply 2 is resumed. At time T5, the program updating process is restarted from an area next to the area indicated by the updating progress data stored before supply of power is stopped.

When restarting the program updating process, the electronic control unit 1 restarts program updating from the area next to the area where writing of the updating program has been normally completed. As a result, the invalid data, which remains in the program updating target unit 10 when supply of power is stopped, is overwritten with normal data.

Detailed processes the program updating process unit 9 carries out to implement the program updating process 103*a* shown in FIG. 2 will be described with reference to FIGS. 3 and FIGS. 4A to 4C.

Figure 3:
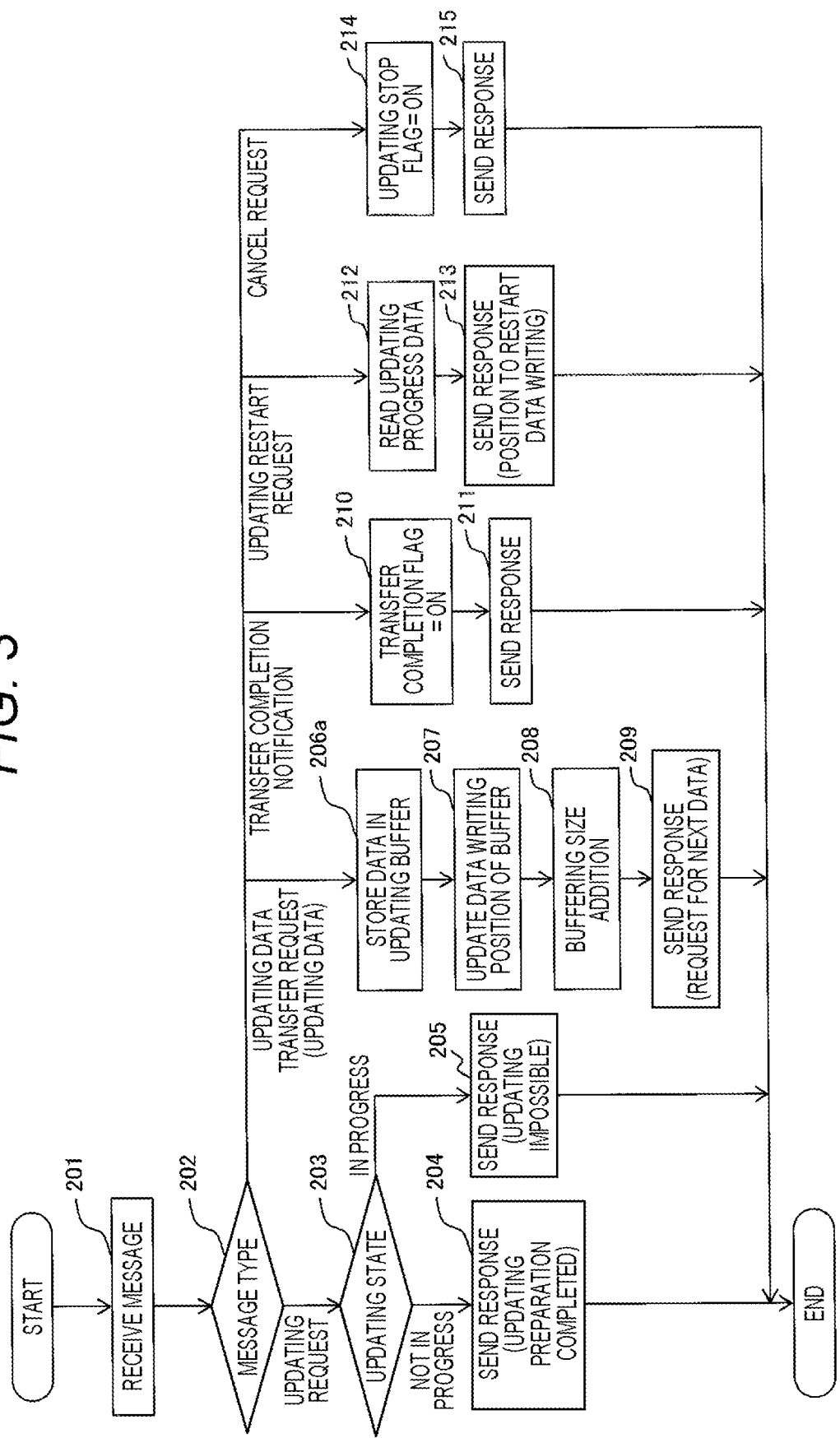
FIG. 3 depicts the first embodiment of the present invention, showing a flowchart of an example of an updating data transfer process in the program updating process.
Figure 4A:
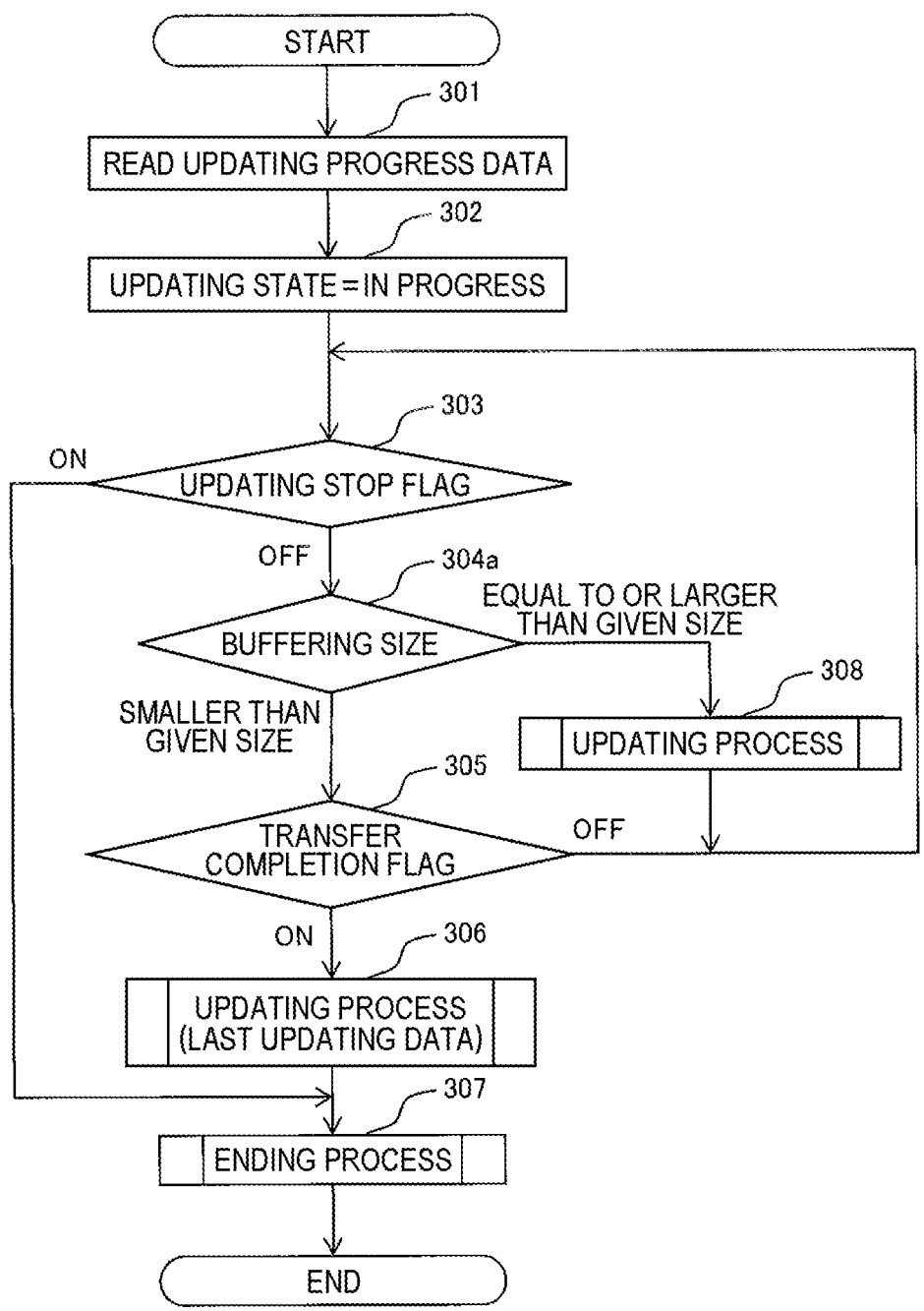
FIG. 4A depicts the first embodiment of the present invention, showing a flowchart of an example of an updating data writing process in the program updating process.
Figure 4B:
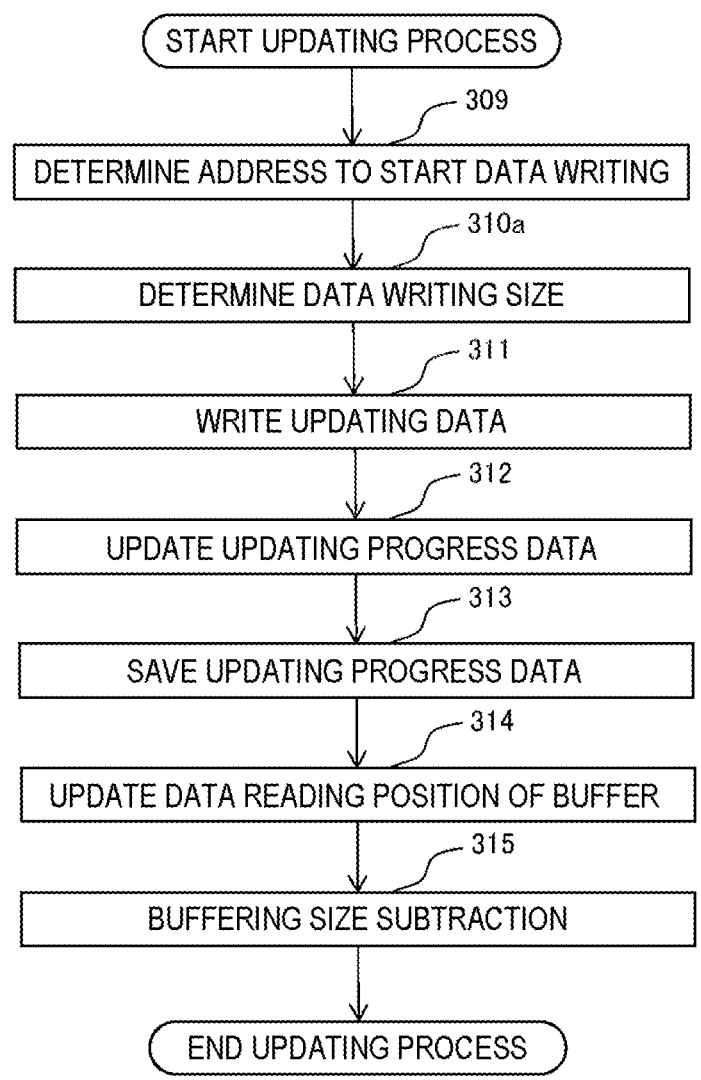
FIG. 4B depicts the first embodiment of the present invention, showing a flowchart of an example of an updating process in the program updating process.
Figure 4C:
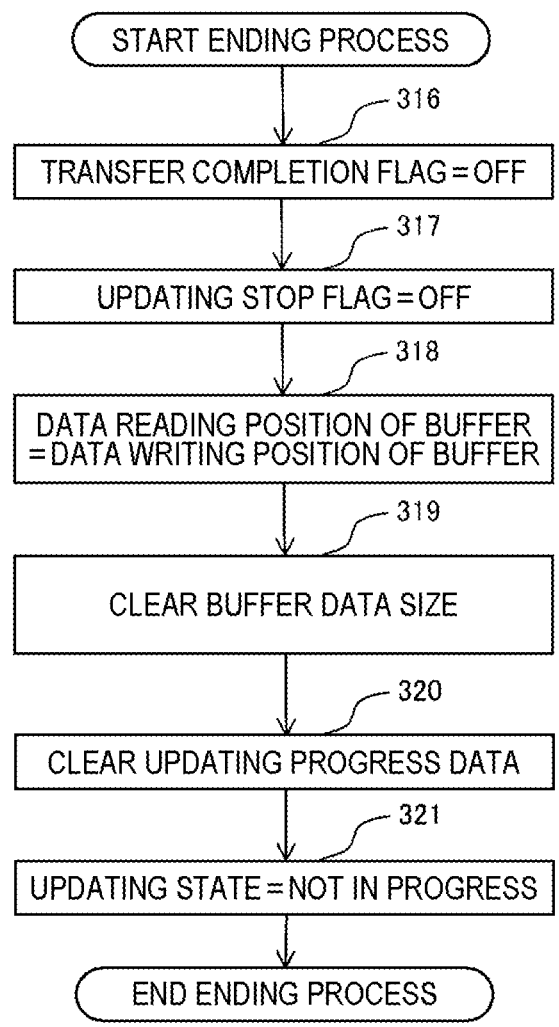
FIG. 4C depicts the first embodiment of the present invention, showing a flowchart of an example of an ending process in the program updating process.

FIG. 3 is a flowchart of an example of an updating data transfer process in the program updating process, and FIG. 4A is a flowchart of an example of an updating data writing process in the program updating process. FIGS. 4B and 4C each depict a sub-routine of the flowchart of FIG. 4A. The program updating process unit 9 simultaneously executes the flowcharts shown in FIGS. 3 and 4A.

An example of a normal program updating process according to the first embodiment, the normal program updating process not having stoppage or resumption of power supply during program updating, will be described below.

Downloading an updating program is started by a trigger event that the electronic control unit 1 receives an updating request from the external device 12. At steps described as steps 201 and 202 of FIG. 3, when receiving a communication message from the external device 12, the program updating process unit 9 determines a type of the received message and executes a process according to the type of the message.

The type of the message can be determined by the program updating process unit 9, based on a data frame conforming to a communication protocol between the external device 12 and the electronic control unit 1 or on information included in the header or the payload of the data frame.

When the type of the message is an updating request, the program updating process unit 9 determines an updating state, at step described as step 203 of FIG. 3. The updating state is a state indicating whether the updating data writing process shown in FIG. 4A is being executed. When the updating data writing process is not being executed, the program updating process unit 9 sends an updating preparation completion response to the external device 12, at step described as step 204 of FIG. 3. Subsequently, the external device 12 sends an updating data transfer request including updating data.

Starting from the head address of an updating program, pieces of updating data are sent sequentially given size by given size.

Updating data is sent as data of a size (fixed length) based on the communication protocol between the external device 12 and the electronic control unit 1. The size of updating data, for example, is 8 bytes when the communication protocol is CAN, is 64 bytes when the communication protocol is CANFD, and is a data volume given by subtracting the header size from the payload size when the communication protocol is Ethernet.

When receiving the updating data transfer request, the program updating process unit 9 acquires updating data and stores the updating data in the updating buffer 50, at step described as step 206*a* of FIG. 3. The updating buffer 50 is a buffer that temporarily stores updating data, and is set in the temporary storage device 5 in advance.

Updating data to be stored in the updating buffer 50 is enqueued in the updating data transfer flowchart shown in FIG. 3 and is dequeued in the updating data writing flowchart shown in FIG. 4A. When a data reading position and a data writing position are controlled in a circular buffer (ring buffer) structure, therefore, sorting updating data is unnecessary, which reduces an amount of arithmetic processing.

After storing updating data in the updating buffer 50 of the temporary storage device 5, the program updating process unit 9 carries out data writing position updating to determine the next data writing position in the updating buffer 50 and data size addition to a buffering size, at steps described as step 207 to step 209 of FIG. 3, and returns a next data request response to the external device 12 (209). At step 208, the program updating process unit 9 adds the size of updating data stored in the updating buffer 50, to the buffering size.

Because the updating data transfer request is sent continuously until transfer of the updating program is completed, processes at steps 206a to 209 of FIG. 3 are repeatedly executed. It should be noted that, depending on the form of communication with the external device 12, the updating data transfer request may be sent repeatedly even when the response described at step 209 of FIG. 3 is not returned. In such a case, returning the response is unnecessary.

When transfer of the updating program is completed, the external device 12 sends a transfer completion notification. Upon receiving the transfer completion notification, the program updating process unit 9 switches a transfer completion flag on (210), at steps described at steps 210 and 211 of FIG. 3, and sends a response to the external device 12 (211).

A process of writing updating data stored in the updating buffer 50 to the program updating target unit 10 is carried out as the updating data writing process shown in FIG. 4A. In the normal program updating process, the program updating process unit 9 determines the buffering size, at step described as step 304a of FIG. 4A. When finding the buffering size of updating data stored in the temporary storage device 5 to be equal to or larger than a given size, the program updating process unit 9 carries out an updating process, at step described as step 308 of FIG. 4.

The given size used for making the determination at step 304a is a unit of dividing the updating program, a unit of size of updating data received from the external device 12, a unit of data writing to the nonvolatile memory 6, the unit being based on the specifications of the arithmetic processing unit 3, or a given size different from each of these units.

The given size may be defined in advance in the program updating process unit 9 or the data storage area 7, or, when an updating request from the external device 12 notifies of a given size, may be defined as that given size.

The unit of data writing to the nonvolatile memory 6, for example, may be defined as a given size of data writing set in advance according to the type of a nonvolatile semiconductor, such as a block size or a page size.

In the updating process at step 308 of FIG. 4A, the program updating process unit 9 determines an address to start data writing to the program updating target unit 10 and a data writing size, at steps described as steps 309 and 310a of FIG. 4B. The size of data to be written by the program updating process unit 9 is the given size described above.

In an updating data writing process at step 311 of FIG. 4B, the program updating process unit 9 reads data of the size corresponding to the data writing size, from the updating buffer 50 of the temporary storage device 5, and carries out data writing in sequence, the data writing starting from the data writing start address, i.e., the address from which data writing to the program updating target unit 10 of the nonvolatile memory 6 starts.

After written in updating data, the program updating process unit 9 updates updating progress data and stores the updated updating progress data in the data storage area 7 of the nonvolatile memory 6, at steps described as steps 312 and 313 of FIG. 4B.

The updating progress data is information indicating an area where updating program writing has been normally completed, and is information that can be used in common by the external device 12 and the electronic control unit 1. The updating progress data indicates, for example, the number of bytes counted from the head of the updating program and the address of the updating program.

After storing the updating progress data, the program updating process unit 9 carries out updating of the data reading position of the updating buffer 50 and subtraction of the buffering size, at steps described as steps 314 and 315 of FIG. 4B, and ends the updating process described as step 308 of FIG. 4A.

At step S314, the program updating process unit 9 adds the size of read data to the reading position of the updating buffer 50 to update the reading position. At step S315, the program updating process unit 9 subtracts the size of read data from the buffering size to update it. Thereafter, the processes at steps 304a and 308 of FIG. 4A are carried out repeatedly until the buffering size is reduced to a size smaller than a given size.

The buffering size is reduced to a size smaller than the given size when updating data from the external device 12 does not arrive at the buffer or when transfer of the updating program is completed but the last piece of updating data whose size does not reach the given size is stored in the updating buffer 50.

In the former case, the transfer completion notification from the external device 12 is not received yet, in which case the transfer completion flag is off. The program updating process unit 9, therefore, monitors the transfer completion flag until the buffering size becomes equal to or larger than the given size, through a determination process at step 305 of FIG. 4A.

In the latter case, on the other hand, the transfer completion notification from the external device 12 is already received, in which case the transfer completion flag is on. The program updating process unit 9, therefore, writes in the last pieces of updating data, at step described as step 306 of FIG. 4A. After updating data writing is completed, an end process is carried out at steps described as step 307 of FIG. 4A and step 316 to 321 of FIG. 4C, which puts the updating data writing flowchart to an end.

FIG. 4C is a flowchart of an example of the end process carried out by the program updating process unit 9. First, the program updating process unit 9 sets the transfer completion flag "OFF" (316). Subsequently, the program updating process unit 9 sets an updating stop flag "OFF" (317).

The program updating process unit 9 resets the data reading position and the data writing position of the buffer in the temporary storage device 5, to the same address. The program updating process unit 9 then clears the data size of the buffer (316).

The program updating process unit 9 clears the updating progress data stored in the data storage area 7 of the nonvolatile memory 6 (350), and resets the updating state to "not in progress" (321). These steps complete the program updating process.

An example of a program updating process according to the first embodiment that is carried out when stoppage or resumption of power supply occurs during program updating will be described below.

According to the updating data writing process shown in FIG. 4A, updating data writing is continued as supply of power to the power supply 2 is continued. Therefore, when supply of power is stopped during a period in which the program updating process unit 9 writes in updating data at step described as step 311 of FIG. 4B, invalid data remains in the program updating target unit 10. However, updating progress data is kept stored in the data storage area 7 of the nonvolatile memory 6 by the process at step 313 of FIG. 4B.

After supply of power is resumed, an updating restart request is sent from the external device 12. The program updating process unit 9 thus reads the updating progress data stored in the data storage area 7 of the nonvolatile memory 6 and sends an updating restart position as a response to the external device 12, at steps described as steps 212 and 213 of FIG. 3.

The updating restart position represents an area next to the area of the updating progress data in the data storage area 7. Because the updating progress data is the information indicating the area where updating program writing is normally completed and the information that can be used in common by the external device 12 and the electronic control unit 1, the external device 12 is able to distribute the updating program by starting the distribution from an area where data writing is not completed.

After the program updating process unit 9 sends the updating restart position response, an updating request is sent from the external device 12. The program updating process unit 9 thus sends an updating preparation completion response at step 204 of FIG. 3 in the same manner as in the normal program updating process described above. In response to this, the external device 12 sends an updating data transfer request including updating data. Before updating restart, the external device 12 sends updating data in sequence, starting from the area next to the area where updating program writing is normally completed. The program updating process unit 9 executes the processes at steps 206a to 209 of FIG. 3, thus storing received updating data in the buffer.

In the updating data writing process shown in FIG. 4A, invalid data, which is remains in the program updating target unit 10 when supply of power is stopped, is overwritten with updating data, and the program updating process is continued.

The program updating process unit 9 first reads updating progress data from the data storage area 7, at step described as step 301 of FIG. 4A, and carries out the updating process at steps described as step 308 of FIG. 4A and steps shown in FIG. 4B in the same manner as in normal program updating.

In the updating process, the program updating process unit 9 determines a writing start address, at step described as step 309 of FIG. 4B. The writing start address needs to be the head of the area where invalid data remaining in the program updating target unit 10 is overwritten. The program updating process unit 9, therefore, defines the writing start address as an area next to an area given by adding the size of updating progress data to the head address of the program updating target unit 10.

In addition, when carrying out the updating data writing process at step 311 of FIG. 4B, the program updating process unit 9 needs to write data with which the invalid data remaining in the program updating target unit 10 is overwritten.

As described above, because the external device 12 sends updating data in sequence, starting from the area next to the area where updating program writing is normally completed, intended data is stored in the updating buffer 50 of the temporary storage device 5. Therefore, in the same manner as in the normal program updating process, the program updating target unit 10 reads data of the size corresponding to the size of wiring data, from the updating buffer 50, and carries out data writing in sequence, starting from a writing start address of the program updating target unit 10. Afterward, the same process as the above normal program updating process (not including power supply stoppage and resumption) is carried out to complete program updating.

A program updating cancelling process according to the first embodiment that is carried out when a cancel request is received during program updating will be described below.

When receiving a cancel request from the external device 12 during program updating, the program updating process unit 9 switches the updating stop flag on and sends a response to the external device 12, at steps described as steps 214 and 215 of FIG. 3. In the updating data writing process shown in FIG. 4A, the program updating process unit 9 carries out a process of determining whether the updating stop flag is on or off, at step described as step 303, carries out the updating process at step 308 of FIG. 4A, and when the updating stop flag is on after execution of step 308, then ends the updating data writing process.

However, when a given size of an area to which the updating program is written is large, stopping the updating process of FIG. 4B takes much time, during which an updating request from the external device 12 may possibly be received. At steps described as step 302 in FIG. 4A and step 321 in FIG. 4C, therefore, the program updating process unit 9 checks whether the updating data writing process is in a state of "in progress" or "not in progress".

When the updating process is in progress, the program updating process unit 9 sends an updating impossible response to the external device 12 at step described as step 203 of FIG. 3, thereby rejecting the updating request from the external device 12. After stoppage of the updating data writing process is completed, the updating state becomes "not in progress". When receiving an updating request, then, the program updating process unit 9 is able to carry out the program updating process.

As described above, according to the first embodiment, even when supply of power is stopped during program updating and invalid data remains in the program updating target unit 10 of the nonvolatile memory 6, the electronic control unit 1 can determine the position to restart data writing to the program updating target unit 10, based on updating progress data stored in the data storage area 7, when supply of power is resumed. The electronic control unit 1 overwrites the invalid data in the program updating target unit 10 with updating data, thus being able to continue the program updating process. Hence, even in a configuration in which the electronic control unit 1 cannot acquire a reliable power supply status, the electronic control unit 1 is able to carry out the program updating process.

Second Embodiment

In the first embodiment, the given size of updating data is a predefined value or a value that an updating request from the external device 12 notifies of, and is a fixed value in one program updating process. The method of the first embodiment is effective in a case where the given size is a fixed value in one program updating process corresponding to a unit of dividing a program or a unit of data writing to the nonvolatile memory 6. The size of updating data, however, is not necessarily a fixed value, and whether it is fixed depends on the form of communication.

A second embodiment achieves a program updating process that allows data writing in units of updating data size even when the given size varies by units of updating data size (variable length) and therefore the size of updating data included in an updating data transfer request is variable.

Figure 5:
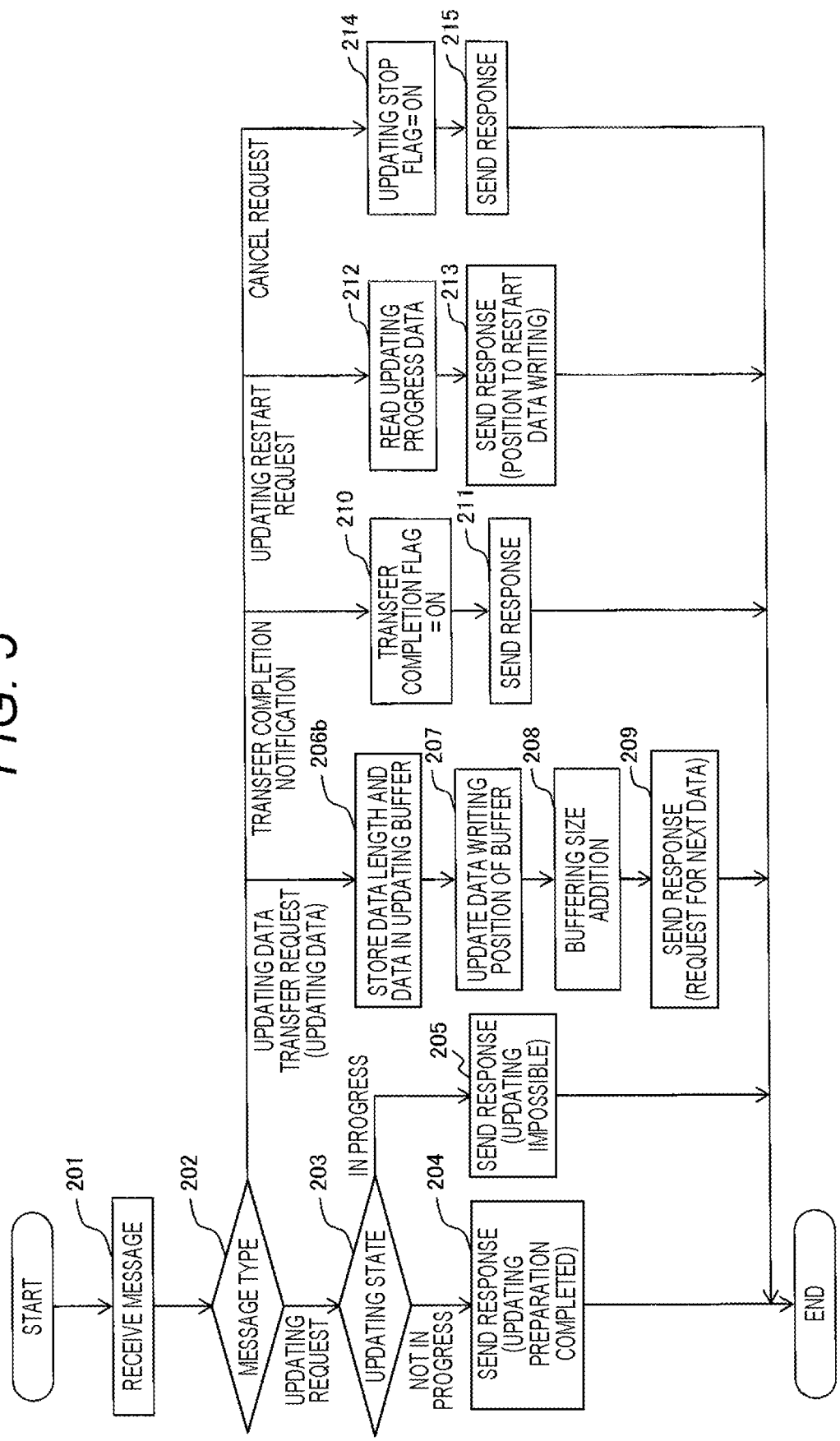
FIG. 5 depicts a second embodiment of the present invention, showing a flowchart of an example of an updating data writing process in a program updating process.
Figure 6A:
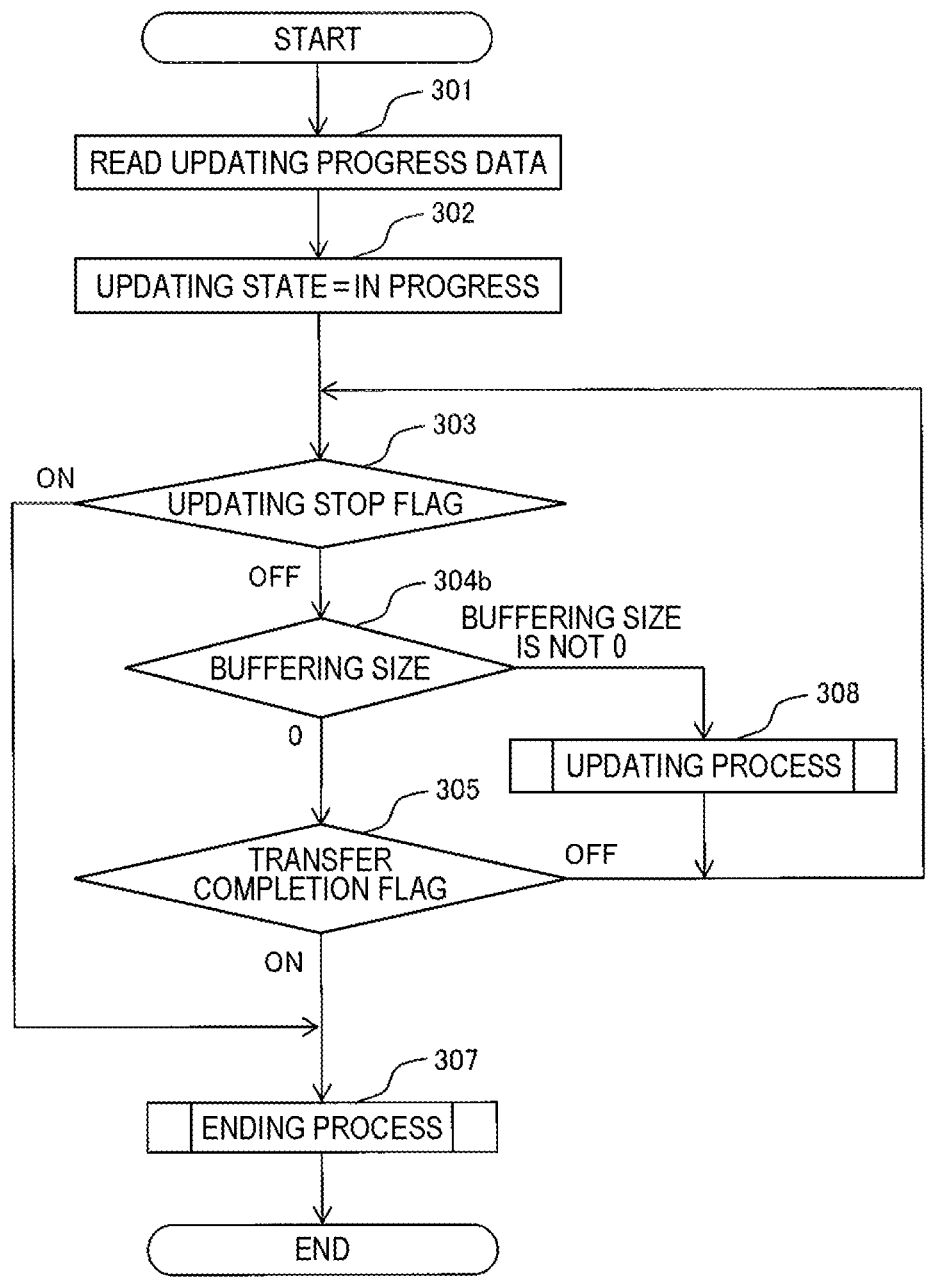
FIG. 6A depicts the second embodiment of the present invention, showing a flowchart of an example of the updating data writing process in the program updating process.
Figure 6B:
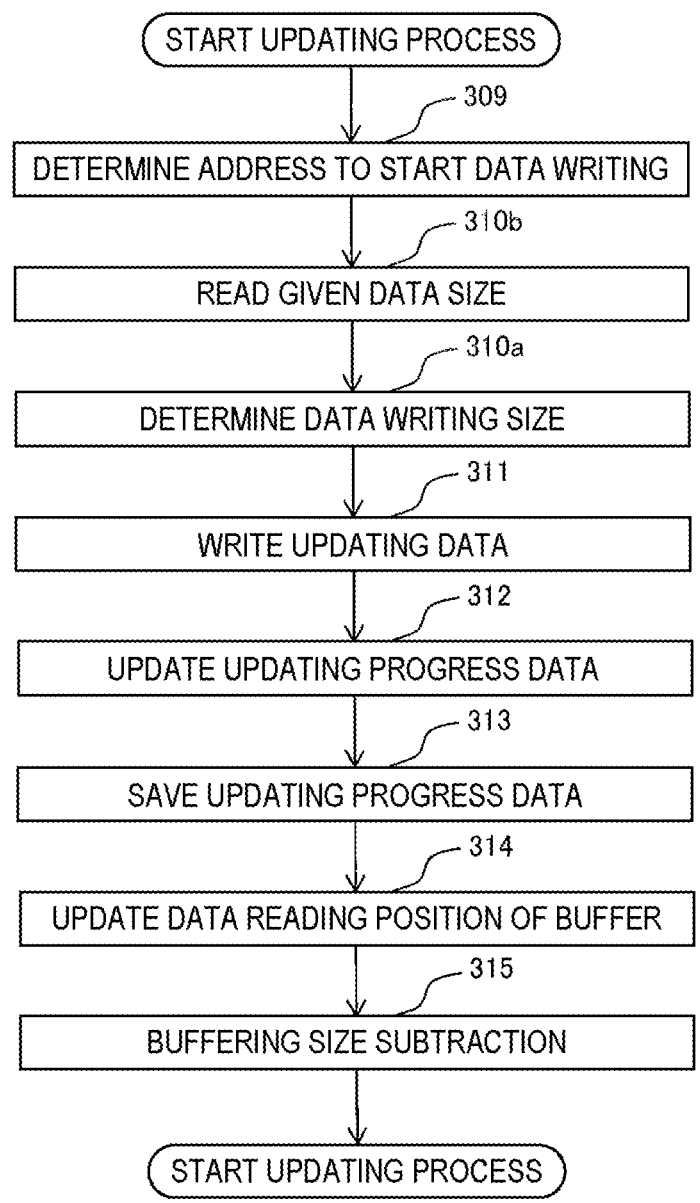
FIG. 6B depicts the second embodiment of the present invention, showing a flowchart of an example of an updating process in the program updating process.

Detailed processes by the program updating process unit 9 according to the second embodiment will be described with reference to FIGS. 5, 6A, and 6B. FIG. 5 is a flowchart of an example of an updating data transfer process according to the second embodiment. FIG. 6 is a flowchart of an example of the updating data writing process according to the second embodiment.

In the updating data transfer process shown in FIG. 5, a process at step 206b is different from the process at step 206a of FIG. 3 of the first embodiment. In the second embodiment, the data length of updating data and the updating data itself, the updating data being received in one data transfer, are stored in sequence in the updating buffer 50.

In the updating data write process shown in FIG. 6A, a buffering size determination process at step 304b is different from the buffering size determination process at step 304a shown in FIG. 4A of the first embodiment. In the second embodiment, when the buffering size is not 0, an updating process at step 308 of FIG. 6 is carried out.

In the updating process, a process at step 310b of FIG. 6B is different from the process at step 310a of FIG. 4B of the first embodiment. According to the process at step 310b of FIG. 6B, the data length of updating data received from the updating buffer 50 in one data transfer is read, and the read data length is determined to be the given size. As a result, even when the size of updating data received in one data transfer changes, data writing in units of updating data size can be carried out.

In the second embodiment, the last piece of updating data of the size not corresponding to the given size does not exist. When the buffering size is 0 in the process at step 304b of FIG. 6A, therefore, the process of writing the last data at step 306 shown in FIG. 4A of the first embodiment is unnecessary. In other aspects, the second embodiment is the same as the first embodiment.

As described above, in addition to the effect of the first embodiment, the second embodiment offers another effect that even when the data length of updating data size is variable, program writing in units of updating data size can be carried out.

Third Embodiment

In the first and second embodiments, when the given size of updating data is small, the number of times of storing updating progress data in the nonvolatile memory 6 increases, and consequently a time to reach the upper limit of the number of times of rewriting in the nonvolatile memory 6 gets shorter. To deal with this problem, a third embodiment provides a program updating process by which the number of times of writing updating progress data is reduced.

The third embodiment is different from the first and second embodiments in that updating progress data is stored in the temporary storage device 5 by the processes at step 313 of FIG. 4B of the first embodiment and at step 313 of FIG. 6B of the second embodiment.

However, because, as described above, data is stored in a volatile storage medium in the temporary storage device 5 and is therefore deleted when supply of power is stopped, the data needs to be periodically saved on the nonvolatile memory 6. An updating progress data saving process according to the third embodiment will be described with reference to FIG. 7.

Figure 7:
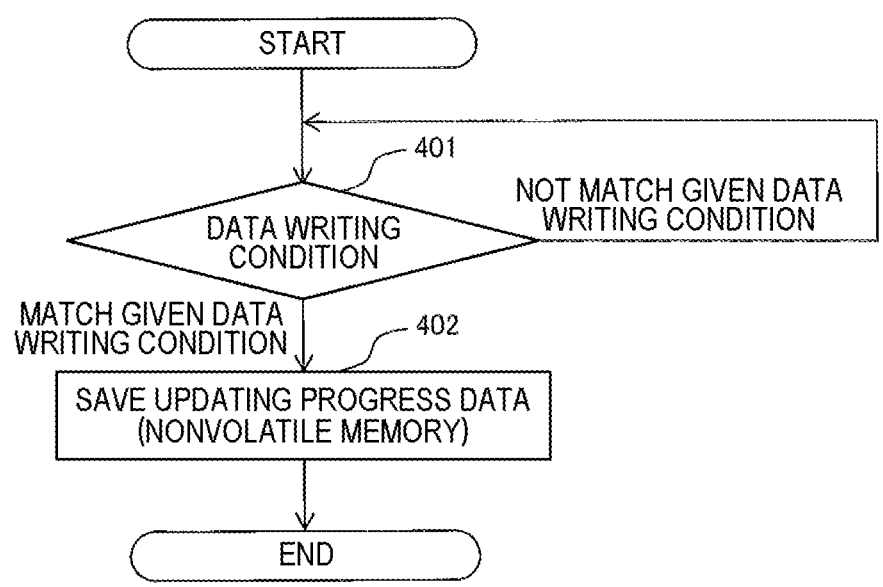
FIG. 7 depicts a third embodiment of the present invention, showing a flowchart of an example of a process of storing updating progress data.

The updating progress data saving process shown in FIG. 7 is carried out independent of the updating data writing process shown in FIGS. 4A to 4C of the first embodiment and FIG. 6 of the second embodiment. The updating progress data saving process is included in the program updating process unit 9.

In the third embodiment, the process of reading updating progress data, which is described in the first and second embodiments, is a process of reading updating progress data not from the data storage area 7 of the nonvolatile memory 6 but from the temporary storage device 5.

First, the program updating process unit 9 makes a determination on a writing condition for data writing to the nonvolatile memory 6, at step described as step 401 of FIG. 7, and when the writing condition matches a given writing condition, proceeds to step 402, at which the program updating process unit 9 reads updating progress data from the temporary storage device 5 and saves the read updating progress data on the nonvolatile memory 6. When the writing condition does not match the given writing condition, on the other hand, the program updating process unit 9 monitors the writing condition to see if it is met, i.e., it matches the given writing condition.

The write condition may be a predefined cycle, or may be a specific value included in a control signal received from the external device 12.

As described above, in addition to the effects of the first and second embodiments, the third embodiment offers an effect that the number of times of writing updating progress data to the nonvolatile memory 6 is reduced, which increases a period of use of the nonvolatile memory 6. It should be noted that the third embodiment can be implemented in combination with the first or second embodiment.

Fourth Embodiment

In the first and second embodiments, when the given size of updating data is small, the number of times of saving updating progress data on the nonvolatile memory 6 increases. In the nonvolatile memory 6, when updating progress data is stored in a specific fixed area, a time to reach the upper limit of the number of rewriting gets shorter in the area. To deal with this problem, a fourth embodiment provides a program updating process by which an area for storing updating progress data is dynamically changed in the nonvolatile memory 6.

Figure 8:
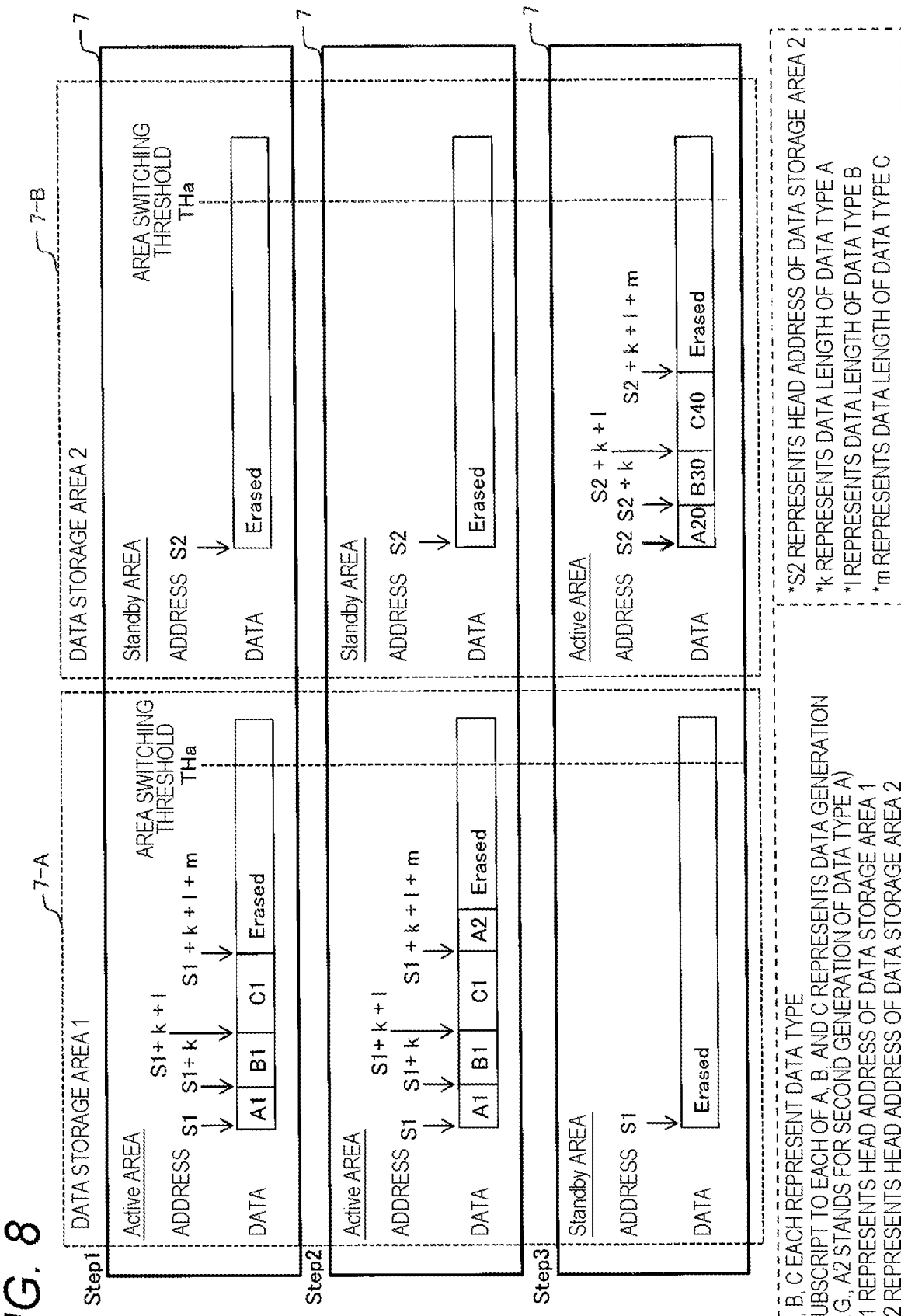
FIG. 8 depicts a fourth embodiment of the present invention, showing an example of a process of saving updating progress data on a nonvolatile memory.

According to the fourth embodiment, in the process of writing in updating progress data at step 313 of FIG. 4B of the first embodiment and at step 313 of FIG. 6B of the second embodiment or in the process of writing in updating progress data at step 402 of FIG. 7 of the third embodiment, an area for storing the updating progress data is dynamically changed (switched) in the nonvolatile memory 6. An updating progress data saving process according to the fourth embodiment will be described with reference to FIG. 8. FIG. 8 depicts an example of a process of saving updating progress data on the nonvolatile memory.

In the fourth embodiment, the data storage area 7 is divided into two areas: an active area and a standby area that are shown in FIG. 8 as a data storage area 7-A and a data storage area 7-B, respectively. The active area is an area where data writing is carried out when a request for data writing to the data storage area 7 is made. At this time, data writing to the standby area is not carried out.

FIG. 8 depicts an example in which in the data storage area 7, the areas 7-A and 7-B dynamically change at three stages of step 1 to step 3.

Step 1 shown in FIG. 8 indicates a state in which various data are stored in the active area (7-A) as data in the standby area (7-B) is erased.

In this state, when data "A2", which is shown in FIG. 8, is stored in the data storage area 7 at step 2 of FIG. 8, the program updating process unit 9 stores the data "A2" in an area next to an area where last data "C1" is stored. Overwriting on an area where data "A1" identical in data type with the data "A2" is stored is not carried out. In saving other pieces of data to follow, the program updating process unit 9 stores data in the area next to the area where the last data is stored, as does at the above step.

When the amount of data stored in the active area exceeds an area switching threshold THa shown in FIG. 8, the program updating process unit 9 switches the active area and the standby area to each other at step 3 shown in FIG. 8.

When switching these areas, the program updating process unit 9 copies latest data of each data type in the old active area (7-A), i.e., data storage area 7-A, to a new active area (7-B), i.e., the data storage area 7-B, and erases the data in the old active area (7-A).

Thereafter, the program updating process unit 9 stores updating progress data in the new active area (7-B) by the same method used for storing updating progress data in the old active area. When the amount of data stored in the new active area (7-B) exceeds the area switching threshold THa shown in FIG. 8, the program updating process unit 9 switches the active area and the standby area to each other again.

As described above, according to the fourth embodiment, the number of times of rewriting in a specific area in the data storage area 7 of the nonvolatile memory 6 can be reduced, and therefore the period of use of the nonvolatile memory 6 can be extended. It should be noted that the fourth embodiment may be implemented in combination with the first embodiment or the second embodiment or the third embodiment.

Fifth Embodiment

In the first embodiment, the second embodiment, the third embodiment, and the fourth embodiment, program updating by wireless means is carried out in such a way that an updating restart request is sent from the external device 12 and the electronic control unit 1 restarts program updating.

Program updating by wired means is carried out in such a way that a dedicated device (e.g., diagnostic device) is connected to the vehicle to transfer an updating program from the device. A known dedicated device, however, does not have an updating restart function. When supply of power to the electronic control unit 1 is stopped during program updating, therefore, program updating must be restarted from the begging.

Besides, because program updating process by wired means is faster than program updating process by wireless means, the risk of failing in program updating is reduced by carrying out program updating in a period in which supply of power is not stopped, and in a case where stoppage of supply of power is expected to occur, suspending program updating and then restarting it when supply of power becomes stable.

In addition, program updating process by wired means is carried out in a vehicle maintenance factory or the like by a worker who has learned how to operate the dedicated device 14. Such a worker is able to accurately recognize stoppage of program updating and carry out program updating again.

As described above, according to the fifth embodiment, program updating by wireless means is carried out by the program updating processes described in the first, second, third, and fourth embodiments, while program updating by wired means is carried out in a period in which supply of power is not stopped, and in a case where stoppage of supply of power is expected to occur, program updating is suspended.

Figure 9:
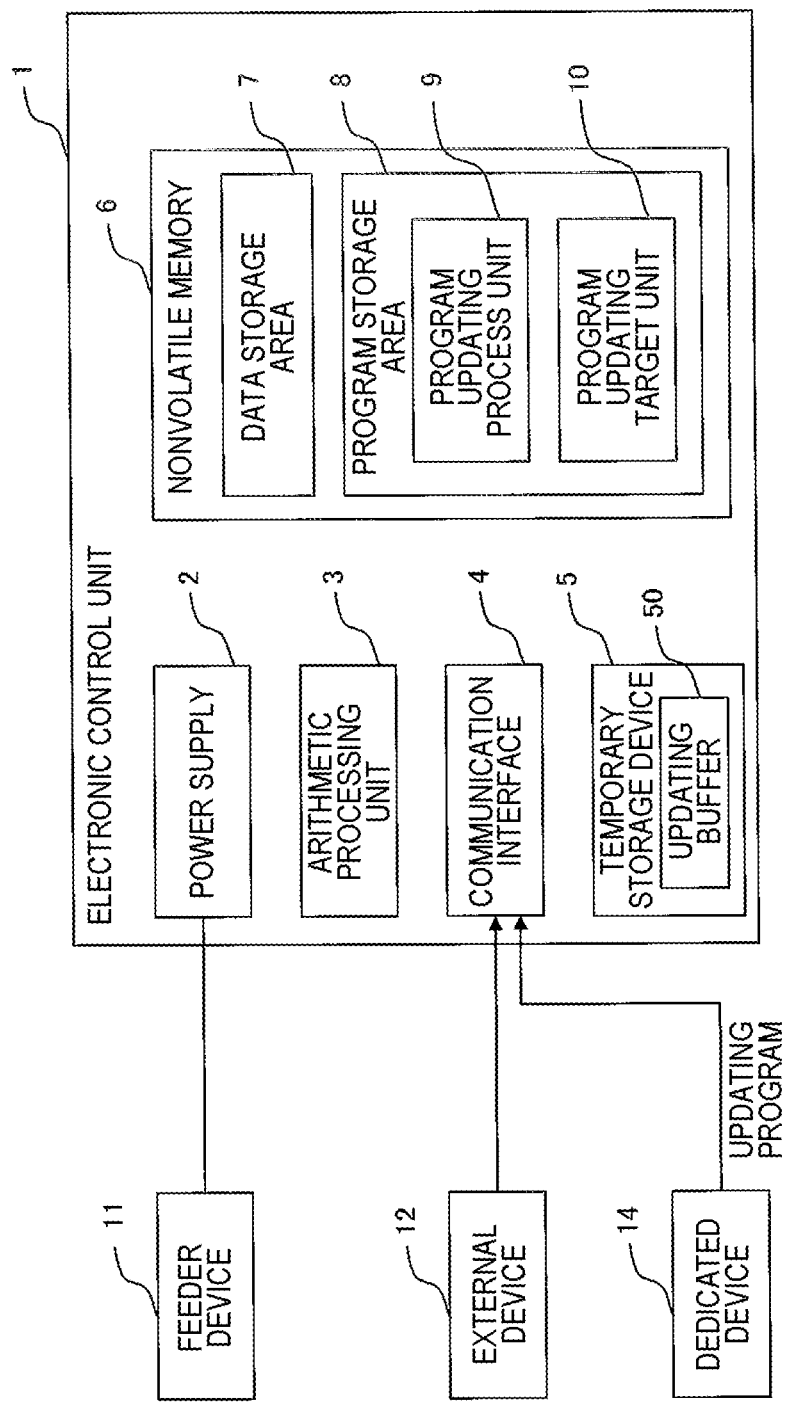
FIG. 9 depicts a fifth embodiment of the present invention, showing a block diagram of an example of the electronic control system incorporated in the vehicle.

FIG. 9 is a block diagram of an example of an electronic control system including the electronic control unit incorporated in the vehicle. The electronic control unit 1 according to the fifth embodiment includes a dedicated device 14 in place of the external ECU 13 shown in FIG. 1 of the first embodiment, the dedicated device 14 being connected to the communication interface 4 via a communication line. As described above, the dedicated device 14 is compose of a diagnostic device or the like. As to other constituent elements, the electronic control unit 1 of the fifth embodiment is the same as the electronic control unit 1 of the first embodiment.

A program updating process by wired means, using the dedicated device 14, will be described with reference to a time chart of FIG. 9. The same details as described with reference to the time chart of FIG. 2 will be omitted in further description.

FIG. 10 depicts a relationship between time transition and the power supply status 101 of the electronic control unit, the power supply status 102 of the vehicle, the program updating process 103a shown in the first embodiment, a first program updating process 103b by wired means, and a second program updating process 103c by wired means. It should be noted that the second program updating process 103c is a modification of the first program updating process 103b, and that these program updating processes are not carried out simultaneously.

Whether an updating request is sent from the external device 12 by wired means or wireless means can be determined based on a data frame conforming to a communication protocol or on information included in the header or the payload of the data frame. Alternatively, a dedicated session may be established between the external device 12 and the electronic control unit 1 in advance for program updating by wireless means or program updating by wired means.

At time T1 in FIG. 10, the power supply status 102 of the vehicle is unstable. The electronic control unit 1, therefore, does not carry out the first program updating process 103b by wired means or the second program updating process 103c by wired means. For example, the electronic control unit 1 discards an updating request and an updating data transfer request from the external device 12 or returns a rejection response.

In addition, the electronic control unit 1 stops data writing from the program updating process unit 9 to the program updating target unit 10.

The power supply status 102 of the vehicle may not be acquired in the first embodiment, second embodiment, third embodiment, and fourth embodiment, but needs to be acquired in the fifth embodiment.

At time T2 in FIG. 10, the power supply status 102 of the vehicle is stable. The electronic control unit 1, therefore, carry out the first program updating process 103b by wired means or the second program updating process 103c by wired means. Because the program updating process by wired means does not include an updating restart function, saving updating progress data in the program updating process is unnecessary.

At time T3 in FIG. 10, the power supply status 102 of the vehicle shifts from stable to unstable. The first program updating process 103b by wired means is, therefore, stopped in the same manner as at time T1. However, even if the power supply status 102 of the vehicle is unstable, supply of power is guaranteed in some cases for a certain period of time following shift from the stable state to the unstable state (e.g., a period between T3 and T3A).

For example, supply of power to the power supply 2 is guaranteed for several minutes after the ignition is switched off. In this case, the program updating process is continued, as indicated by the second program updating process 103c by wired means.

At time T3A in FIG. 10, a power supply guarantee time is ended. At this point of time, therefore, the second program updating process 103c by wired means of is stopped as is at time T1. The power supply guarantee time is defined in advance by the electronic control unit 1, and a period following a point of time (T3) of the power supply status of the vehicle having shifted from the stable state to the unstable state is counted, and the program updating process is stopped on condition that the count period exceeds a defined value (T3A).

As described above, according to the fifth embodiment, the program updating process by wired means and the program updating process by wireless means are switched case by case, and program updating is carried out in accordance with each case. It should be noted that the fifth embodiment may be implemented in combination with the first embodiment or the second embodiment or the third embodiment or the fourth embodiment.

Conclusion

As described above, the electronic control unit and the electronic control system according to the above embodiments may be configured as follows.

(1) An electronic control unit (1) comprising: a power supply (2) to which supply of power from outside is switched on or off; a communication interface (4) that communicates with an external device (13); a nonvolatile memory (6) that holds a program and data; and an arithmetic processing unit (3) that executes the program, wherein the nonvolatile memory (6) includes a program storage area (8) that stores the program; and a data storage area (7) that stores data, wherein the program storage area (8) has a program updating process unit (9) that carries out an updating process; and a program updating target unit (10) that stores an updating program, wherein the arithmetic processing unit (3) reads the program updating process unit (9) as the program and executes the program, divides an updating program received by the communication interface (4) into divided updating programs each having a given size, and writes each of the divided updating programs to the program updating target unit (10), and wherein the arithmetic processing unit (3) stores updating progress data in the data storage area (7), the updating progress data indicating a position of the divided updating program having been written to the program updating target unit (10).

In the above configuration, even when supply of power is stopped during program updating and invalid data remains in the program updating target unit 10 of the nonvolatile memory 6, the electronic control unit 1 can determine a position to restart data writing to the program updating target unit 10, based on updating progress data stored in the data storage area 7, when supply of power is resumed. The electronic control unit 1 overwrites the invalid data in the program updating target unit 10 with updating data, thus being able to continue the program updating process. Hence, even in a configuration in which the electronic control unit 1 cannot acquire a reliable power supply status, the electronic control unit 1 is able to carry out the program updating process.

(2) The electronic control unit according to (1), wherein when supply of power to the power supply (2) is switched off to stop data writing and then is switched on, the arithmetic processing unit (3) reads the updating progress data from the data storage area (7), and restarts the data rewriting from an area next to an area where the data writing is completed or from a head of an area where the data writing is stopped.

In the above configuration, when supply of power is resumed, the arithmetic processing unit 3 is able to determine a position to restart data writing to the program updating target unit 10, based on updating progress data stored in the data storage area 7, overwrite invalid data with updating data, and continue the program updating process.

(3) The electronic control unit according to (1), wherein the communication interface (4) receives information indicating a state of an ignition, and wherein even when the information indicating the state of the ignition indicates the ignition being off, the arithmetic processing unit (3) continues the data writing in a period during which power is supplied to the power supply (2).

In the above configuration, when supply of power to the power supply 2 is guaranteed for several minutes following a point of time of the ignition being switched off, the program updating process is continued, which facilitates the progress of the program updating process.

(4) The electronic control unit according to (1), wherein when the updating program is divided to distribute divided pieces of programs, the given size is a unit of dividing the updating program.

In the above configuration, when the update program is divided into divided pieces of program and the divided pieces of program are sent from the external device 12, the electronic control unit 1 determines the size of each divided piece of program to be given size, thus being able to write the divided piece of program to the program updating target unit 10.

(5) The electronic control unit according to (1), wherein the given size is a unit size of data received by the communication interface (4).

In the above configuration, the electronic control unit 1 determines the size of an updating program received by the communication interface 4 to be the given size, thus being able to write the updating program to the program updating target unit 10.

(6) The electronic control unit according to (1), wherein the given size is a unit of data writing to the nonvolatile memory (6).

In the above configuration, by determining the unit of data writing to the nonvolatile memory 6 to be the given size, the electronic control unit 1 is able to efficiently carry out data writing to the program updating target unit 10.

(7) The electronic control unit according to (1), wherein the arithmetic processing unit (3) dynamically switches a plurality of areas set in the data storage area (7) and writes the updating progress data to the areas.

In the above configuration, by switching the plurality of areas of the nonvolatile memory 6 and carrying out data writing to the areas, the electronic control unit 1 suppresses concentration of data writing in a specific part (area), thus being able to extend a period of use of the nonvolatile memory 6.

(8) The electronic control unit according to (1), further comprising a temporary storage device (5) including a volatile storage medium, wherein the arithmetic processing unit (3) stores the updating progress data in the temporary storage device (5) and then writes the updating progress data to the data storage area (7) at given timing.

The above configuration prevents a case where because of the given size of updating data being small, the number of times of writing updating progress data to the nonvolatile memory 6 increases and consequently a time to reach the upper limit of the number of times of data rewriting in the nonvolatile memory 6 gets shorter. Therefore, by writing updating progress data to the temporary storage device 5 composed of a volatile storage medium and then writing the updating progress data to the data storage area 7 of the nonvolatile memory 6 at giving timing, the number of times of data writing to the nonvolatile memory 6 can be reduced.

(9) An electronic control system comprising: electronic control unit (1) including a power supply (2) to which supply of power from outside is switched on or off, a communication interface (4) that communicates with an external device (13), a nonvolatile memory (6) that holds a program and data, and an arithmetic processing unit (3) that executes the program; and an external device (13) having a wireless communication unit, the external device (13) receiving an updating program and sending the updating program to the electronic control unit (1), wherein the nonvolatile memory (6) includes a program storage area (8) that stores the program; and a data storage area (7) that stores data, wherein the program storage area (8) has a program updating process unit (9) that carries out an updating process; and a program updating target unit (10) that stores an updating program, wherein the arithmetic processing unit (3) reads the program updating process unit (9) as the program and executes the program, divides the updating program that the communication interface (4) receives from the external device (13), into divided updating programs each having a given size, and writes each of the divided updating programs to the program updating target unit (10), and wherein the arithmetic processing unit (3) stores updating progress data in the data storage area (7), the updating progress data indicating a position of the divided updating program having been written to the program updating target unit (10).

According to the above configuration, even when supply of power is stopped during program updating and invalid data remains in the program updating target unit 10 of the nonvolatile memory 6, the electronic control unit 1 can determine a position to restart data writing to the program updating target unit 10, based on updating progress data stored in the data storage area 7, when supply of power is resumed. The electronic control unit 1 overwrites the invalid data in the program updating target unit 10 with updating data, thus being able to continue the program updating process. Hence, even in a configuration in which the electronic control unit 1 cannot acquire a reliable power supply status, the electronic control unit 1 is able to carry out the program updating process.

(10) The electronic control system according to (9), wherein when supply of power to the power supply (2) is switched off to stop data writing and then is switched on, the arithmetic processing unit (3) reads the updating progress data from the data storage area (7), and restarts the data rewriting from an area next to an area where the data writing is completed or from a head of an area where the data writing is stopped.

In the above configuration, when supply of power is resumed, the arithmetic processing unit 3 is able to determine a position to restart data writing to the program updating target unit 10, based on updating progress data stored in the data storage area 7, overwrite invalid data with updating data, and continue the program updating process.

(11) The electronic control system according to (9), further comprising a dedicated device (14) connected to the electronic control unit (1) via a communication line, wherein the communication interface (4) receives the updating program from the dedicated device (14) through wired communication, and wherein when receiving the updating program from the dedicated device (14), the arithmetic processing unit (3) writes the updating program to the program updating target unit (10).

According to the above configuration, in contrast with the program updating process by which an updating program from the external device 12 is received through wireless communication and the updating progress data is written to the nonvolatile memory 6 at completion of updating data writing, an updating program received from the dedicated device 14 is written directly to the program updating target unit 10 of the nonvolatile memory 6, and therefore the program updating process can be carried out quickly.

(12) The electronic control system according to (11), wherein the communication interface (4) receives information indicating a state of an ignition, and wherein when receiving information indicating the ignition being in off-state, the arithmetic processing unit (3) rejects a program updating request from the external device (13).

In the above configuration, when the information indicating the state of the ignition indicates off-state, a program updating request from the external device (13) is rejected, and program updating process from the dedicated device 14 is executed, instead.

(13) The electronic control system according to (12), wherein when receiving information indicating the ignition being in off-state, the arithmetic processing unit (3) counts time from a point of reception of the off-state information, continues the data writing until the time reaches a given time, and then stops the data writing from the dedicated device.

In the above configuration, when supply of power to the power supply 2 is guaranteed for several minutes following a point of time of the ignition being switched off, the program updating process is continued, which facilitates the progress of the program updating process.

It should be noted that the present invention is not limited to the above embodiments but includes various modifications. For example, the above embodiments have been described in detail for easy understanding of the present invention, and are not necessarily limited to embodiments including all constituent elements described herein. Some constituent elements of a certain embodiment may be replaced with constituent elements of another embodiment, and a constituent element of another embodiment may be added to a constituent element of a certain embodiment. In addition, some constituent elements of each embodiment may be added or deleted or replaced to or with constituent elements of anther embodiment, and such deletion, addition, and replacement may be made separately or in a combined form.

Some or all of the above constituent elements, functions, processing units, processing means, and the like may be provided as hardware, such as properly designed integrated circuits. In addition, the above constituent elements, functions, and the like may be provided as software-based programs by causing a processor to interpret and execute programs for implementing the constituent elements and functions. Information for implementing functions, such as programs, tables, and files, may be stored in a storage device, such as a memory, a hard disk, and a solid state drive (SSD), or in a recording medium, such as an IC card, an SD card, and a DVD.

A group of control lines/information lines considered to be necessary for description are illustrated, and all control lines/information lines making up the product are not necessarily illustrated. It is safe to assume that, actually, almost the entire constituent elements are interconnected.

REFERENCE SIGNS LIST 1 electronic control unit
2 Power supply
3 arithmetic processing unit
4 temporary storage area
5 communication interface
6 nonvolatile memory
7 data storage area
8 program storage area
9 program updating process unit
10 program updating target unit
11 external feeder device
12 external device
13 external ECU
14 dedicated device

The invention claimed is:

1. An electronic control unit comprising:
a power supply to which supply of power from outside is switched on or off;
a communication interface that communicates with an external device;
a nonvolatile memory that holds a program and data; and
an arithmetic processing unit that executes the program, wherein
the nonvolatile memory includes a program storage area that stores the program, and a data storage area that stores data, wherein
the electronic control unit further comprises a program updating process unit that carries out an updating process, a program updating target unit that stores an updating program, and a temporary storage unit that temporarily stores the updating program received via the communication interface, and a data length of the updating program, and wherein
the arithmetic processing unit:
reads, from the nonvolatile memory, the program updating process unit as the program for execution,
calculates a buffering size of data received from the external device before the updating program is written to the program updating target unit, wherein the buffering size is associated with an updating buffer of the temporary storage unit,
determines the buffering size,
executes the program in response to receiving a program updating request from the external device, wherein the program manages processing of the updating program,
divides the updating program, received via the communication interface and temporarily stored in the temporary storage unit, into divided updating programs as part of executing the program, each of the divided updating programs having a given size when the buffering size is equal to or larger than the given size,
writes each of the divided updating programs to the program updating target unit,
stores updating progress data in the data storage area, the updating progress data indicating positions of the divided updating programs having been written to the program updating target unit,
determines updated data size according to the updating progress data responsive to each of the divided updating programs having been respectively written to the program updating target unit,
reduces the buffering size according to the updated data size determined according to the updating progress data,
responsive to the power supply having been switched off, which stops data writing of the divided updating programs, and subsequently switched on,
reads the updating progress data from the data storage area, the updating progress data indicating the positions of the divided updating programs having been written to the program updating target unit, and
restarts the data writing of a portion of the divided updating programs from a first area next to a second area where the data writing is completed or from a head of a third area where the data writing is stopped, and
determines completion of updating data writing in response to the buffering size reduced to a size smaller than the given size.

2. The electronic control unit according to claim 1, wherein
the communication interface receives information indicating a state of an ignition, and wherein
even when the information indicating the state of the ignition indicates the ignition being off, the arithmetic processing unit continues the data writing in a period during which power is supplied to the power supply.

3. The electronic control unit according to claim 1, wherein when the updating program is divided to distribute divided pieces of programs, the given size is a unit of dividing the updating program.

4. The electronic control unit according to claim 1, wherein the given size is a unit size of data received by the communication interface.

5. The electronic control unit according to claim 1, wherein the given size is a unit of data writing to the nonvolatile memory.

6. The electronic control unit according to claim 1, wherein the arithmetic processing unit dynamically switches a plurality of areas set in the data storage area and writes the updating progress data to the plurality of areas.

7. The electronic control unit according to claim 1, further comprising a temporary storage device including a volatile storage medium, wherein
the arithmetic processing unit stores the updating progress data in the temporary storage device and then writes the updating progress data to the data storage area at given timing.

8. An electronic control system comprising:
an electronic control unit including a power supply to which supply of power from outside is switched on or off, a communication interface that communicates with an external device, a nonvolatile memory that holds a program and data, and an arithmetic processing unit that executes the program; and
the external device receiving an updating program and sending the updating program to the electronic control unit, wherein the nonvolatile memory includes a program storage area that stores the program, and a data storage area that stores data, wherein the electronic control unit further comprising a program updating process unit that carries out an updating process, a program updating target unit that stores the updating program, and a temporary storage unit that temporarily stores the updating program received via the communication interface, and a data length of the updating program, wherein the arithmetic processing unit:

reads, from the nonvolatile memory, the program updating process unit as the program for execution, calculates a buffering size of data received from the external device before the updating program is written to the program updating target unit, wherein the buffering size is associated with an updating buffer of the temporary storage unit, determines the buffering size, executes the program in response to receiving a program updating request from the external device, wherein the program manages processing of the updating program, divides the updating program, received via the communication interface and temporarily stored in the temporary storage unit, into divided updating programs as part of executing the program, each of the divided updating programs having a given size when the buffering size is equal to or larger than the given size, writes each of the divided updating programs to the program updating target unit, stores updating progress data in the data storage area, the updating progress data indicating positions of the divided updating programs having been written to the program updating target unit, determines updated data size according to the updating progress data responsive to each of the divided updating programs having been respectively written to the program updating target unit, reduces the buffering size according to the updated data size determined according to the updating progress data, responsive to the power supply having been switched off, which stops data writing of the divided updating programs, and subsequently switched on, reads the updating progress data from the data storage area, the updating progress data indicating the positions of the divided updating programs having been written to the program updating target unit, and restarts the data writing of a portion of the divided updating programs from a first area next to a second area where the data writing is completed or from a head of a third area where the data writing is stopped, and determines completion of updating data writing in response to the buffering size reduced to a size smaller than the given size.

9. The electronic control system according to claim 8, further comprising a dedicated device connected to the electronic control unit via a communication line, wherein the communication interface receives the updating program from the dedicated device through wired communication, and wherein the arithmetic processing unit writes the updating program to the program updating target unit, the updating program being received from the dedicated device.

10. The electronic control system according to claim 9, wherein the communication interface receives information indicating a state of an ignition, and wherein when receiving information indicating the ignition being in off-state, the arithmetic processing unit rejects the program updating request from the external device.

11. The electronic control system according to claim 10, wherein when receiving information indicating the ignition being in the off-state, the arithmetic processing unit counts time from a point of reception of the information indicating the ignition being in the off-state, continues the data writing until the time reaches a given time, and then stops the data writing from the dedicated device.

* * * * *